(12) United States Patent
Cannon, III et al.

(10) Patent No.: US 7,933,981 B1
(45) Date of Patent: Apr. 26, 2011

(54) METHOD AND APPARATUS FOR GRAPHICAL REPRESENTATION OF ELEMENTS IN A NETWORK

(75) Inventors: Thomas C. Cannon, III, San Jose, CA (US); Stephanie Dee, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 601 days.

(21) Appl. No.: 11/472,591

(22) Filed: Jun. 21, 2006

(51) Int. Cl.
*G06F 15/173* (2006.01)
*G06F 15/177* (2006.01)
(52) U.S. Cl. .................... 709/223; 709/220; 715/734
(58) Field of Classification Search .................. 709/223, 709/224
See application file for complete search history.

(56) References Cited

U.S. PATENT DOCUMENTS

| | | | | |
|---|---|---|---|---|
| 5,727,157 | A * | 3/1998 | Orr et al. .................... | 709/224 |
| 6,823,299 | B1 * | 11/2004 | Contreras et al. ............. | 703/14 |
| 2002/0165934 | A1 * | 11/2002 | Conrad et al. ................ | 709/217 |
| 2004/0133565 | A1 * | 7/2004 | Hinshaw et al. ................. | 707/3 |
| 2004/0205726 | A1 * | 10/2004 | Chedgey et al. .............. | 717/125 |
| 2004/0221015 | A1 * | 11/2004 | Sun et al. ..................... | 709/207 |
| 2005/0154690 | A1 * | 7/2005 | Nitta et al. ..................... | 706/46 |
| 2005/0286414 | A1 * | 12/2005 | Young et al. .................. | 370/216 |
| 2006/0037019 | A1 * | 2/2006 | Austin et al. .................. | 718/100 |
| 2006/0085530 | A1 * | 4/2006 | Garrett ......................... | 709/223 |
| 2006/0085668 | A1 * | 4/2006 | Garrett ............................. | 714/4 |
| 2006/0149674 | A1 * | 7/2006 | Cook et al. ..................... | 705/44 |
| 2008/0239957 | A1 * | 10/2008 | Tokura et al. ................. | 370/235 |
| 2009/0217248 | A1 * | 8/2009 | Bently et al. ................. | 717/132 |
| 2009/0234878 | A1 * | 9/2009 | Herz et al. .................... | 707/102 |

* cited by examiner

*Primary Examiner* — Patrice L Winder
*Assistant Examiner* — Ebrahim Golabbakhsh

(57) ABSTRACT

A process to increase the readability of topology diagrams and to simultaneously show multiple relationships for a large number of elements or nodes in a network. Redundant relationships or connections between nodes are systematically hidden but in such a way that the removed relationships or connections can be inferred from the remaining relationships in the diagram. As a result, diagram elements or nodes are positioned closer to respective related elements and overlapping relationship lines, or connections, in the diagram are greatly reduced.

22 Claims, 13 Drawing Sheets

METHOD AND APPARATUS FOR GRAPHICAL REPRESENTATION OF ELEMENTS IN A NETWORK

FIELD OF THE INVENTION

The present invention is directed to a process for increasing the readability of topology diagrams. A method is described that reduces the complexity of a displayed topology diagram without significantly sacrificing information contained therein. Redundant connections are removed from the display to simplify the representation and yet remain capable of information being inferred by the user.

BACKGROUND OF THE INVENTION

A network can be considered as an interconnected system of things or people where the things or people can be referred to as elements or nodes in the network. One example of a network is a system of interconnected computers or devices. These computers or devices may include, e.g., servers, storage devices, routers, etc. The devices may be connected in many ways including, for example, telephone line, Ethernet, or wireless. Further, the computer network may be perceived, or managed, as a network of interconnected software programs, i.e., operating systems, accounting systems, virtual machines, etc.

With any network, it is often helpful, or necessary from an administrative perspective, to be able to visualize the nodes or elements and their respective connections, i.e., visualize the topology of the network. A topology diagram graphically depicts relationships between the elements or nodes in the network. The diagram includes lines, or edges, representing connections or relationships between interconnected nodes. These diagrams, however, can become quite complex, especially when there is an attempt to simultaneously show multiple relationships for a large number of elements.

Known topology diagrams fall into two categories. The first category of diagrams represents only one relationship between nodes, for example, the subnets of a computer network. This technique of only showing one relationship cannot be easily or efficiently applied to systems or networks in which each element is related to more than one other element because multiple maps or diagrams would be necessary. In a second category of diagram, multiple relationships may be shown but the diagram elements are positioned statically based on some metadata of the node, for example, the type of element or the element's geographic location. This static positioning, however, causes a number of edge, i.e., connection, crossings to increase dramatically as the number of elements increases.

One shortcoming of such known diagrams is that the diagram becomes unreadable as the number of elements or nodes being represented increases. While such diagrams work well for systems in which each element or node is related to only one other element or node, such as a hierarchical topology, as the number of relationships per element or node increases, however, the lines required to represent the relationships in the diagram will cross each other. Such a diagram, with a large number of intersecting lines, quickly becomes almost unreadable.

Traditional topological diagrams statically position graph elements as a function of a particular characteristic. As shown in FIG. 1, such static positioning inevitably leads to multiple line crossings. As shown in the topology diagram 100, the static positioning of the devices LUN1, LUN2 with respect to their networks SAN1, SAN2, and further with respect to the server icons Server1, Server2, Server3, etc., results in a number of line crossings, where lines represent connectivity, that decreases the readability of the diagram.

In addition, and similar to the display 100 shown in FIG. 1, another topology display 200, as shown in FIG. 2, is also difficult to read due to the large number of line crossings. It is interesting to note that each of the diagrams 100, 200 contains just fourteen elements but each is still difficult to read. As evidenced by FIG. 2, rearranging the locations of static elements in a graph does not help to clarify the diagram. Due to the limitations of static positioning, as the number of elements increases, diagrams such as these would become unreadable.

SUMMARY OF THE INVENTION

As networks of devices become more complicated and the number of nodes and edges in the network increase, a method and system is needed that will reduce the clutter in a topology diagram while at the same time visually convey as much information with regard to the network and the interconnections between the nodes as is possible.

Advantageously, the present invention is directed to a process to increase the readability of topology diagrams and to simultaneously show multiple relationships for a large number of elements or nodes. As has been described previously, known diagrams quickly become unreadable as the number of diagram elements or nodes increases. Embodiments of the present invention both position diagram elements in relation to all related elements as well as systematically hide redundant relationships that can be inferred from other relationships in the diagram. As a result of the present invention, diagram elements are positioned closer to respective related elements and overlapping relationship lines, or connections, in the diagram are greatly reduced. Further, the present invention allows topology maps to scale up to sizes at which traditional layouts or maps would become incomprehensible.

In one embodiment, a method of depicting interconnected nodes in a network, each node having a type, comprises: determining a plurality of pairs of connected nodes; for each pair of connected nodes: if one node is of a first type and the other node is of a second type: identifying each other node connected to each of the nodes in the respective pair of connected nodes; and removing, from subsequent processing, each connection from the second type node to each of the common nodes; and depicting the nodes and remaining connections.

In another embodiment, a filtering process is applied to reduce a number of pairs of connected nodes to be processed.

Each node may be one of: a host computer; a storage system; a network node; and a virtual machine node.

In another embodiment, a method of graphically representing a plurality of interconnected elements in a network comprises: identifying each element in the plurality of interconnected elements; determining, for each identified element, each other element connected to the respective element to define a plurality of pairs of connected elements; for each pair of connected elements in the plurality of pairs of connected elements: determining if one element is primary and the other element is secondary; if one element is primary and the other is secondary: identifying, as common elements, all other elements that have a connection to each of the elements in the respective pair of elements; and marking each connection from the secondary element to each of the common elements; and displaying the elements and the connections that are not marked.

In yet another embodiment, a method is provided for, in a computer network comprising a plurality of interconnected nodes, where each node is one of: a host system; a virtual machine instance; a network node; and a storage system, representing the nodes and the interconnections therebetween, comprising: determining a plurality of pairs of connected nodes; for each pair of connected nodes in the plurality of connected nodes: if one node is of a first type and the other node is of a second type: identifying, as a common node, each other node connected to each of the nodes in the respective pair of connected nodes; and removing, from subsequent processing, each connection from the second type node to each of the common nodes; and processing and depicting the remaining nodes and connections.

BRIEF DESCRIPTION OF THE DRAWINGS

The above and further advantages of the invention may be better understood by referring to the following description in conjunction with the accompanying drawings in which:

FIGS. 4, 4A and 4B are flow charts in accordance with another embodiment of the present invention;

DETAILED DESCRIPTION

Figure 1:
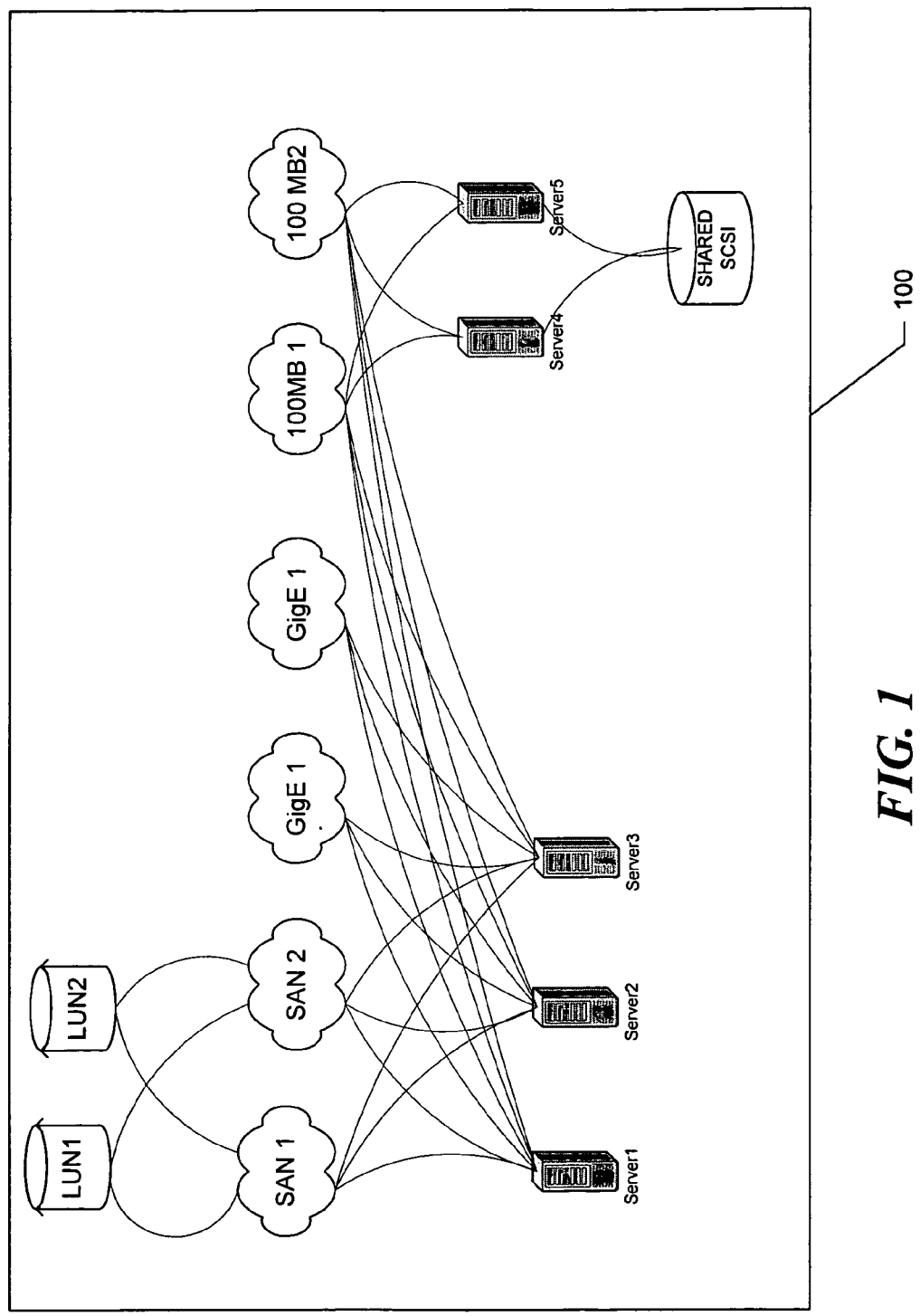
FIG. 1 is a conventional topology diagram.

The invention is herein described, by way of example only, with reference to the accompanying drawings. It is stressed that the particulars shown are by way of example and for purposes of illustrative discussion of the various embodiments of the present invention only, and are presented in the cause of providing, what is believed to be, the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for the sake of clarity, described in the context of separate embodiments, may also be provided in combination in a single embodiment. Conversely, various features of the invention, which are, for brevity, described in the context of a single embodiment, may also be provided separately or in any suitable subcombination.

As has been described previously, the static positioning of diagram elements inflates the number of line crossings in the diagram. Relative diagram element positioning, however, for highly interconnected systems, is only partially effective in producing more easily readable diagrams. For the most extreme or pathological case, where every element is related to nearly every other element in the network, no positioning scheme will sufficiently reduce the number of line crossings in the diagram. For these highly interconnected systems, in accordance with one embodiment of the present invention, sets of redundant relationships are collapsed down to a single relationship between two elements. The "collapsing" of these redundant relationships results in a less cluttered representation but one where a significant amount of the information is inferable by a viewer, i.e., a person viewing the display.

Figure 2:
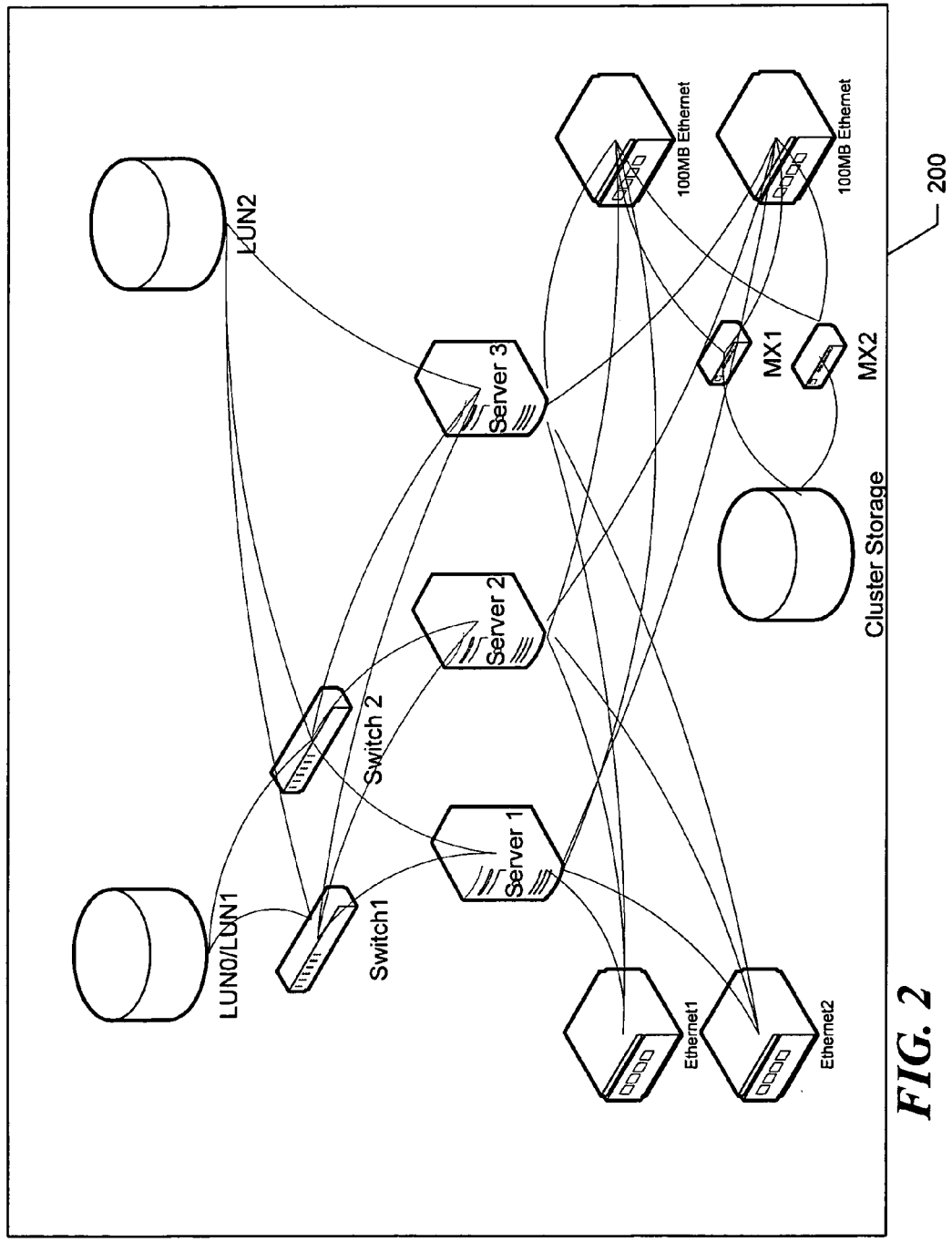
FIG. 2 is another representation of a conventional topology diagram.

At this point, it should be noted that the terms "node" and "element" are used interchangeably and are meant to represent items that are interconnected either in a network or any other system in which there are relations between two or more items. Thus, one non-limiting example would be a computer network similar to that which is represented by the diagrams in FIGS. 1 and 2.

The terms "edge" and "connection" are, herein, used interchangeably to reference the relationship between two nodes. Thus, an edge or connection between two nodes in, for example, a computer network, may be of a particular type in reality, for example, an Ethernet connection or a phone line connection.

Finally, it is to be noted that relationships between nodes may not necessarily involve a physical connection in the real world. The network may be a set of defined relationships between entities that would then be considered nodes or elements in the network. For example, a connection or edge between a parent and child may be established in a network of relationships where there is, clearly, no "physical" connection.

Figure 3:
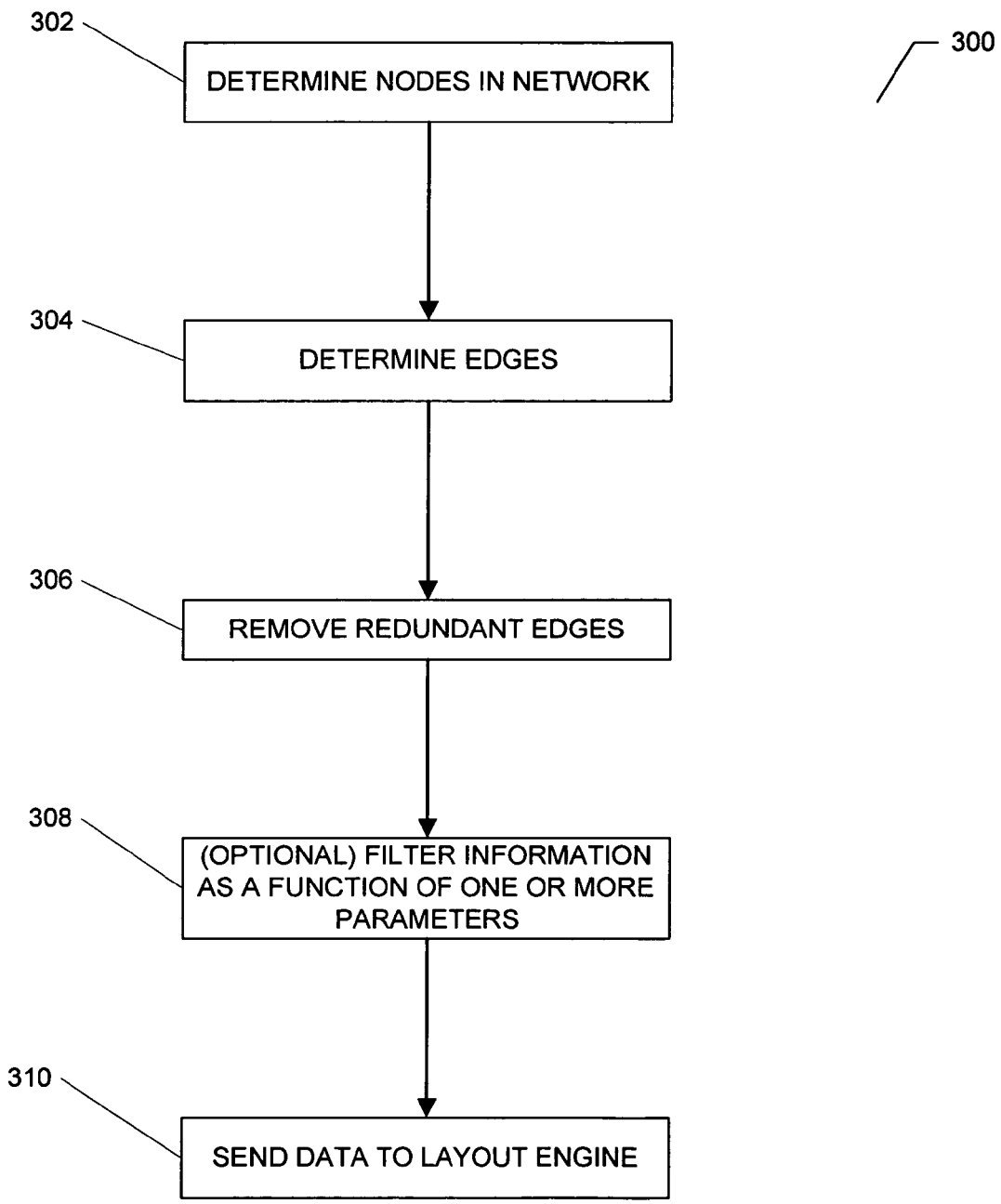
FIG. 3 is a flow chart in accordance with one embodiment of the present invention.

In general, and with reference to a process 300 as shown in FIG. 3, initially the nodes or elements in a network are determined, step 302. For each node in the network, step 304, respective connections or edges are determined. At step 306, redundant edges are removed from the list of edges in the network. It should be noted that this "removal" is not a disconnection between the respective nodes, but rather, is a reduction in the information with regard to connections that will be subsequently processed.

Optionally, at step 308, a filtering process may be applied to the node and edge information once the redundant edges have been removed. The processed information, with or without the filter step applied, is then provided to a graphical layout engine for display, step 310.

The determination of the nodes and the edges therebetween, step 302, step 304, above, may be performed, or the information obtained, in accordance with one or more of any known protocols or technologies for obtaining such information. For example, in a computer network, the polling or retrieval of information from connected devices may be obtained via a protocol such as SNMP. The information may be retrieved by either an active or a passive mechanism. In an active mode, a central device such as a network management server may contact each device and request information with regard to the device's status as well as information regarding any other devices to which that device is connected. The network management server would then crawl through the network inquiring of each device and recording the information that it retrieves. Alternatively, devices on the network may be required or programmed to report status in accordance with a time schedule as well as provide a list of other devices to which each device is connected. The connection information may contain data with regard to, for example, type of connection, activity, speed, bandwidth, usage, etc.

Figure 4A:
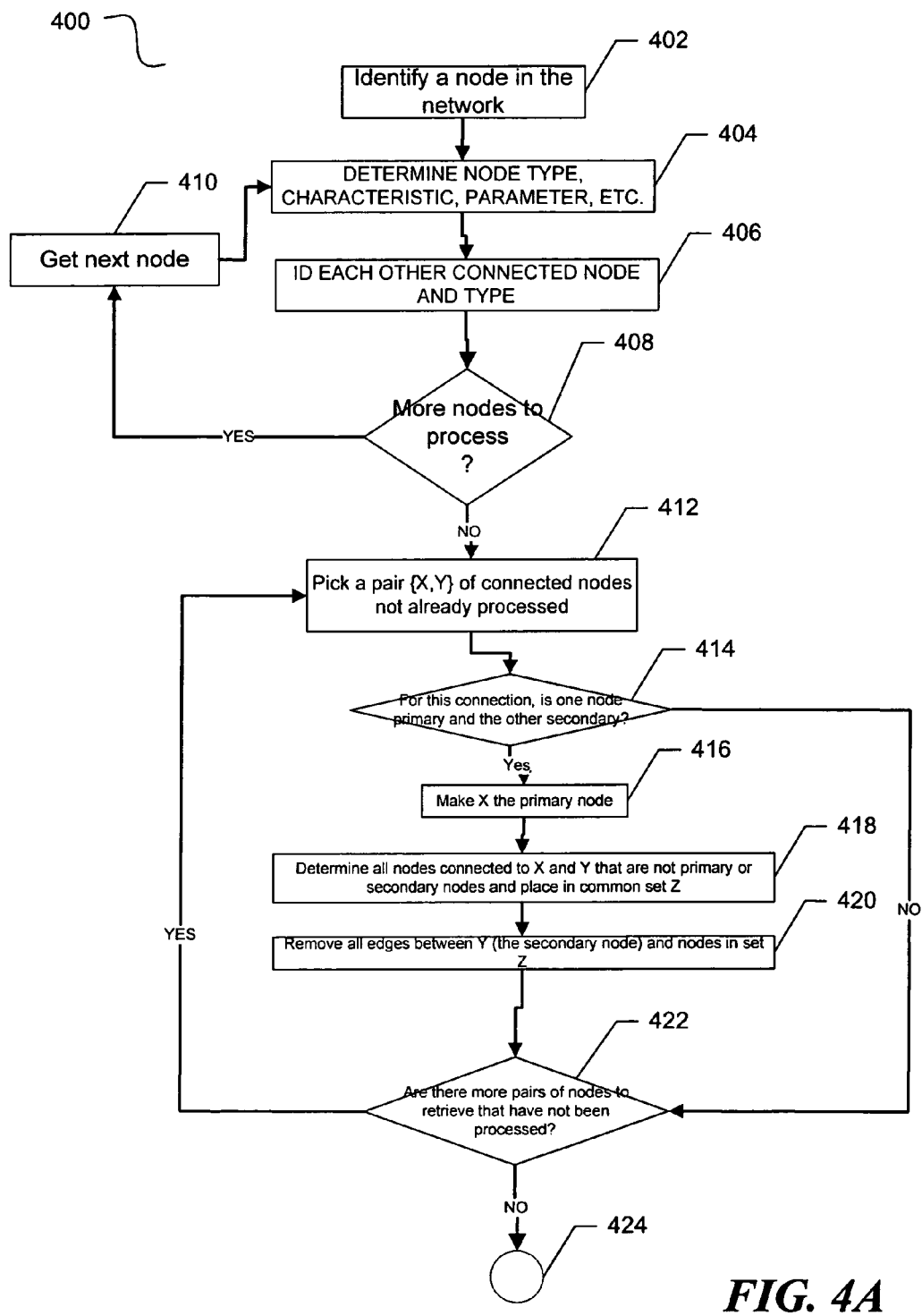

Referring now to FIG. 4A, a method 400 of gathering such information, in one embodiment of the present invention, starts at step 402 where a node or element in the network is identified. Subsequently, step 404, information with regard to the identified node is determined. This information includes, but is not limited to, type, characteristic, performance parameters, etc. At step 406, each other node that is connected to the respective node is identified. This edge or connection information as between two nodes is stored. As one of ordinary skill in the art would understand, such retrieved information may be stored in any one of a number of known structures including, but not limited to, flat tables, relational databases, object-oriented data structures, etc. If it is determined at step 408 that there are more nodes to process, then control passes to step 410 where a next node is retrieved and its respective information and connections are determined.

Once all of the nodes in the network have been identified then, each pair {X, Y} of connected nodes not already processed is identified at step 412. At step 414, it is determined if one node in the pair is primary and the other node is secondary. The designation of a node as being either primary or secondary is a predetermination that is made or pre-defined by the user and from which the determination as to which edges or connections to remove is made. For example, and not intending to be limiting, a node may be defined as being primary or secondary based on any one or more of its characteristics, or entire classes or types of nodes may be classified as primary or secondary. Further, a node (or class of nodes) may be considered "neutral" in that it is neither primary or secondary. A non-limiting example will be described below.

At step 416, for the purposes of explanation, the primary node of the pair will be referred to as X. Subsequently, for node X in step 418, all other nodes that are connected to each of node X and node Y, and which are not primary or secondary, are determined and placed in a common set Z. The number of edges is reduced by removing all of the connections or edges between node Y, i.e., the secondary element in this pair, and those nodes in the set Z, at step 420. Thus, if two elements X, Y share a primary relationship and each is related to another set of elements (Z) then the relationship or edges between the secondary node (Y) and all elements held in common in this set (Z) are hidden or removed.

At step 422, it is determined if there are more pairs of nodes to retrieve that have not been processed. If it is determined that there are more pairs of nodes to process, then control passes back to step 412. If there are no more nodes then control passes to step 450.

Figure 4B:
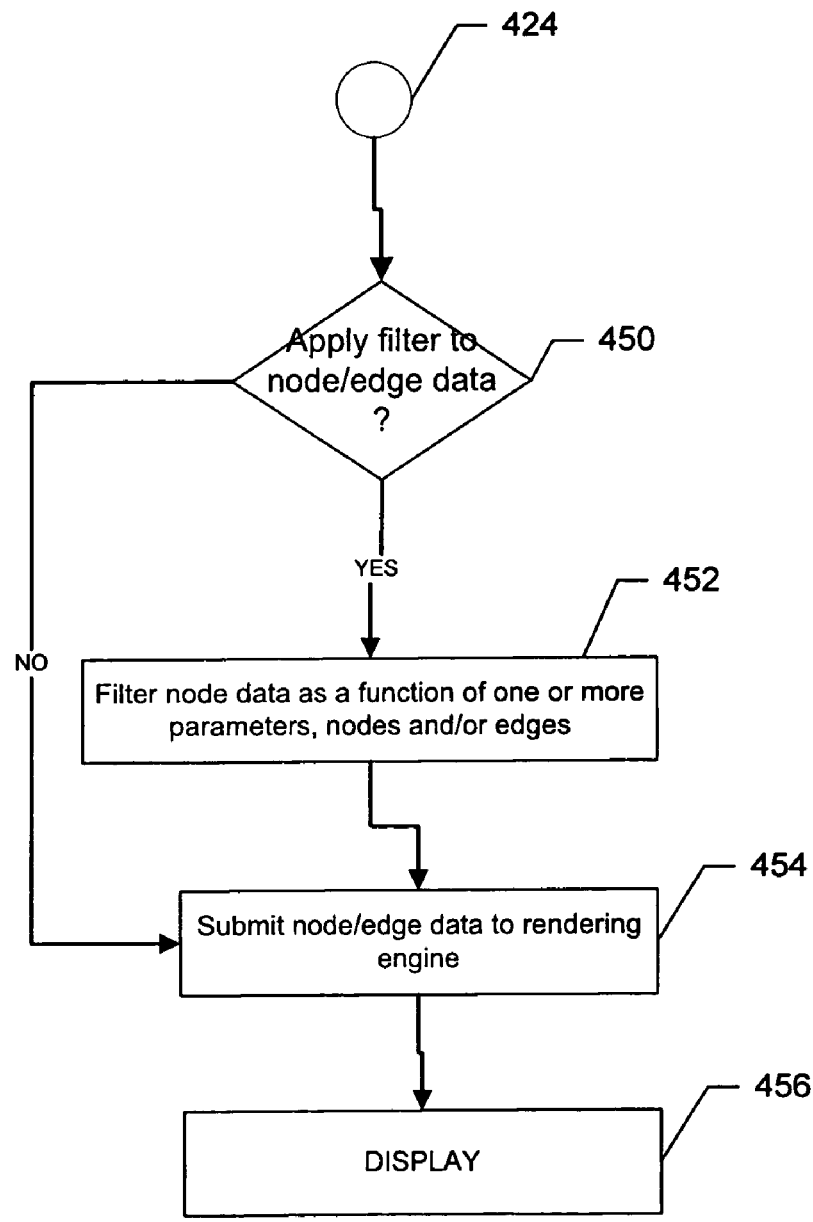

At step 450, as shown in FIG. 4B, it is determined whether or not to apply a filter function to the node and/or edge data. If the filter function is to be applied, then control passes to step 452. Otherwise control passes to step 454 to be explained below.

At step 452, a filter function or algorithm is applied to the node data and the edge data to further reduce the amount of information to be subsequently displayed. In one non-limiting example, with reference to a computer network, the filter algorithm may be set to only pass nodes that are either server or storage devices. Thus any node that is not a server or a storage device, and edges connected thereto, would be removed from the data that is subsequently processed and displayed. Of course, one of ordinary skill in the art would understand that any one or more parameters for nodes and/or edges in the data may be used as the basis for the filtering process. Still further, one of ordinary skill would understand that the filtering process may be run prior to the determination of which edges or connections are to be removed, in order to reduce the amount of connection information. The explanation herein with regard to optionally placing the filtering function after the edge reduction function is not meant to be limiting and is set forth only for purposes of explanation.

Once the filter function is applied, then the node and edge data are submitted to a rendering engine at step 454 for subsequent display at step 456. Any one of the known rendering engines may be used to display the topology diagram.

One such topology generating engine is referred to as a symmetric layout algorithm for displaying of the topology information where the number of line crossings is reduced by positioning each element solely in relation to its related elements. There are two benefits from such a positioning scheme. First, the number of line crossings is greatly reduced, thereby improving the overall readability of the graph. Secondly, the elements with multiple relationships are positioned centrally in the diagram. Those elements with fewer relationships are placed at the diagram's edges.

The concepts of the present invention may be applied to a network comprising interconnected computers and storage devices. In such a system, for example, virtual machines, as are available from VMware Inc. of Palo Alto, Calif., are running in conjunction with the computers and storage devices of the network. It would be advantageous to a system administrator to be able to understand the relationship between the virtual machines, the computers and the storage devices in the network. It is conceivable that such a network may comprise hundreds of elements.

Figure 5:
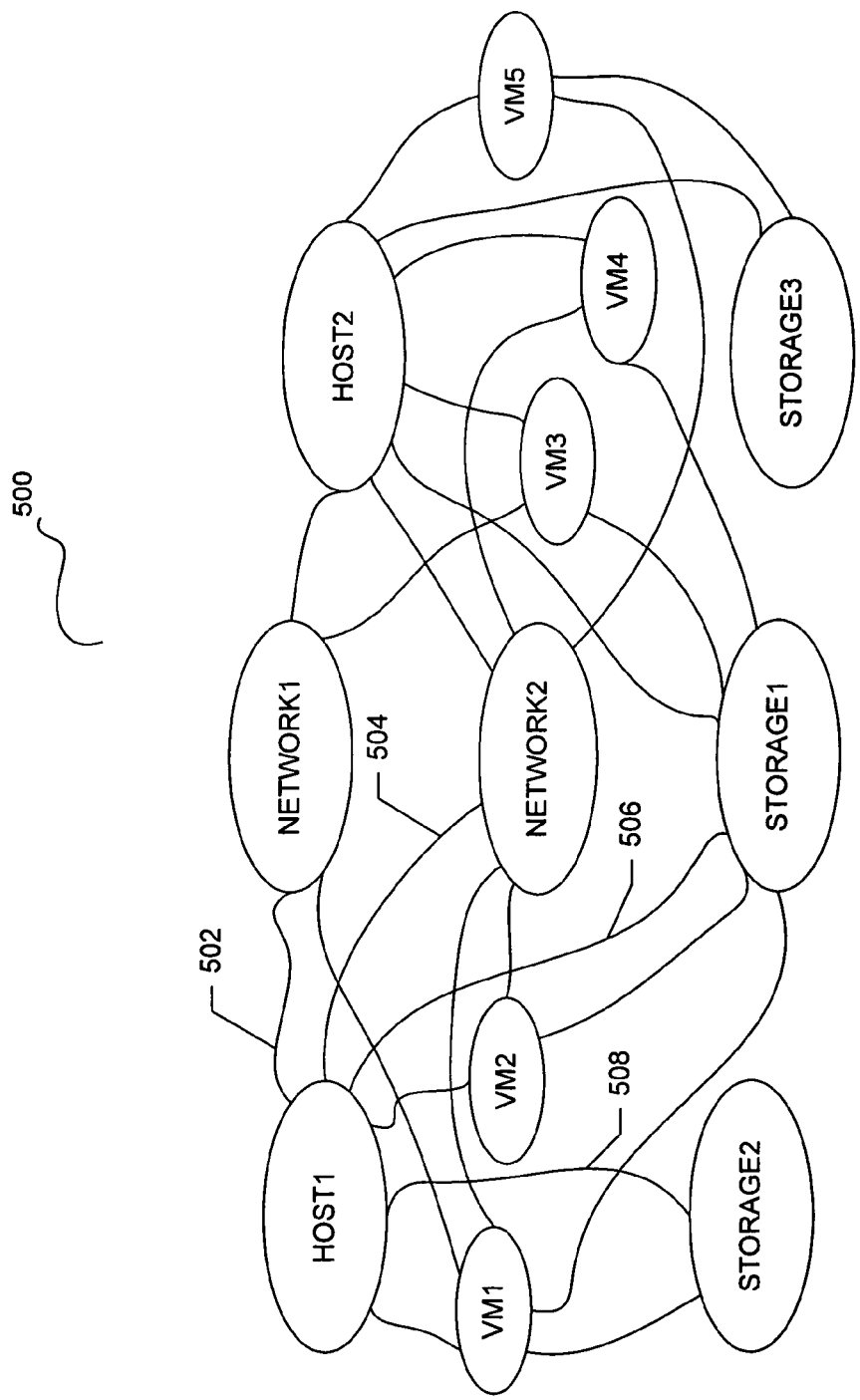
FIG. 5 is a conceptual representation of the connections between nodes in a network.

An example of the edge reduction algorithm will now be described with regard to a virtual machines network 500 as shown in FIG. 5. In the network 500, a number of hosts, HOST1, HOST2 and HOST3 are interconnected, over networks NETWORK1 and NETWORK2, to storage systems STORAGE1, STORAGE2 and STORAGE3. Virtual machines VM1, VM2, VM3, VM4 and VM5 run on the hosts and are stored on one or more of the storage systems STORAGE1, STORAGE2, and STORAGE3. The connections between the various nodes on the network 500 are represented by the lines between nodes.

Further, with regard to the example of network 500, the virtual machines are defined as primary and the hosts are secondary. The network devices and the storages systems are neutral.

It should be noted that the representation of the network 500 shown in FIG. 5 is not a topology diagram as would be presented to a user on, for example, a computer screen, but rather, is a conceptual representation of the relations or connections between the nodes in the network 500 for purposes of explanation.

Applying the edge reduction algorithm of the present invention to the network 500, all of the nodes in the network 500 are traversed and the edges identified. Looking at one primary node, VM1 for example, it is determined that VM1 is connected to HOST1, NETWORK1, NETWORK2, STORAGE1 and STORAGE2. Taking the {VM1, HOST1} pair, it is determined that HOST1 is also connected to NETWORK1, NETWORK2, STORAGE1 and STORAGE2 by connections 502, 504, 506, 508, respectively. Thus, NETWORK1, NETWORK2, STORAGE1 and STORAGE2 are in the set {Z} for the {VM1, HOST1} pair. As network nodes and storage systems are neutral, the connections 502, 504, 506, 508 between the secondary node, i.e., HOST1, and NETWORK1, NETWORK2, STORAGE1 and STORAGE2 are removed. The algorithm is applied to all other pairs of nodes in the network 500. Edges are identified as being redundant and then removed. Edges between two neutral nodes, or between two nodes where neither node is primary or secondary, are not removed from the list of edges to be processed.

Figure 6A:
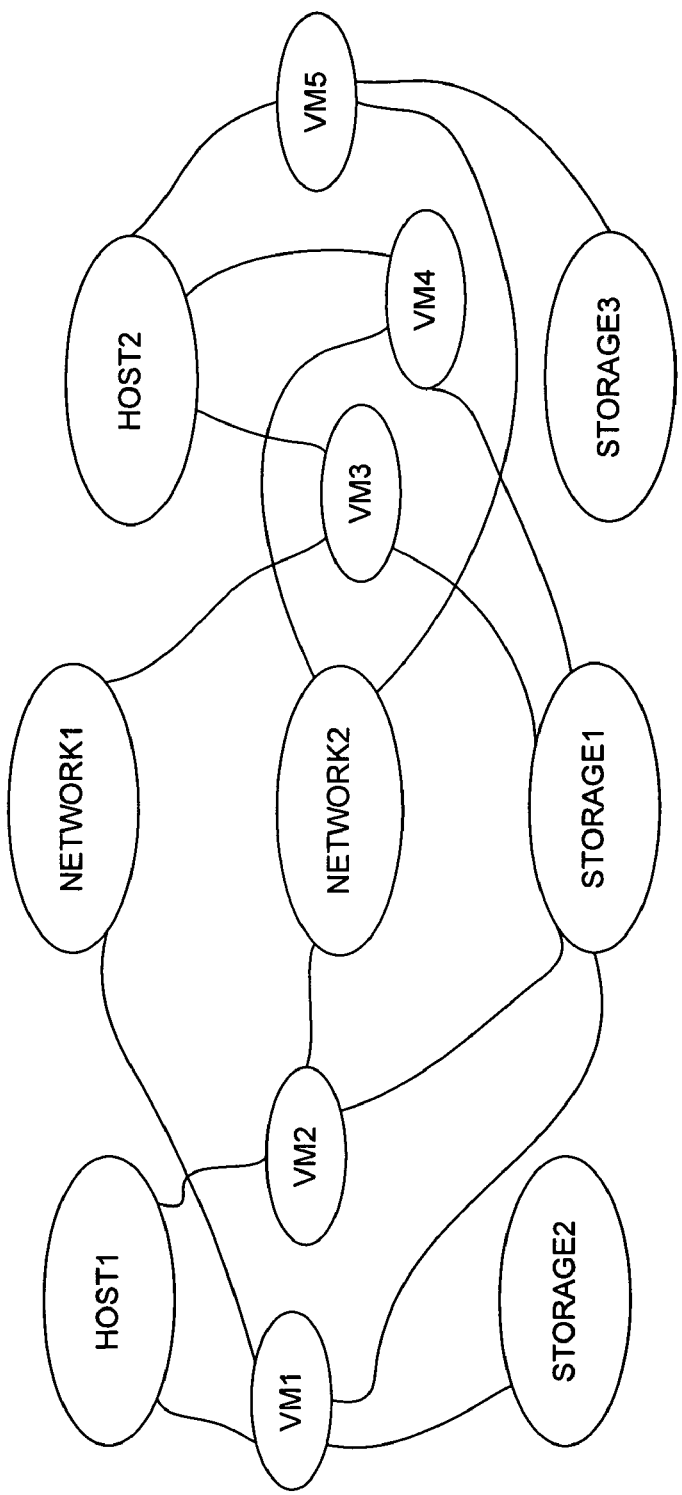
FIGS. 6A and 6B are conceptual representations of the nodes in the network of FIG. 5 after processing in accordance with embodiments of the present invention.

Referring to FIG. 6A, the network 500, once processed for edge reduction, results in the conceptual representation shown in FIG. 6A. As one can see, the number of edges has been significantly reduced. Further, there is no significant reduction in information being conveyed, as information, while explicitly shown in the conceptual representation in FIG. 5, can be inferred from the representation in FIG. 6A.

Figure 7A:
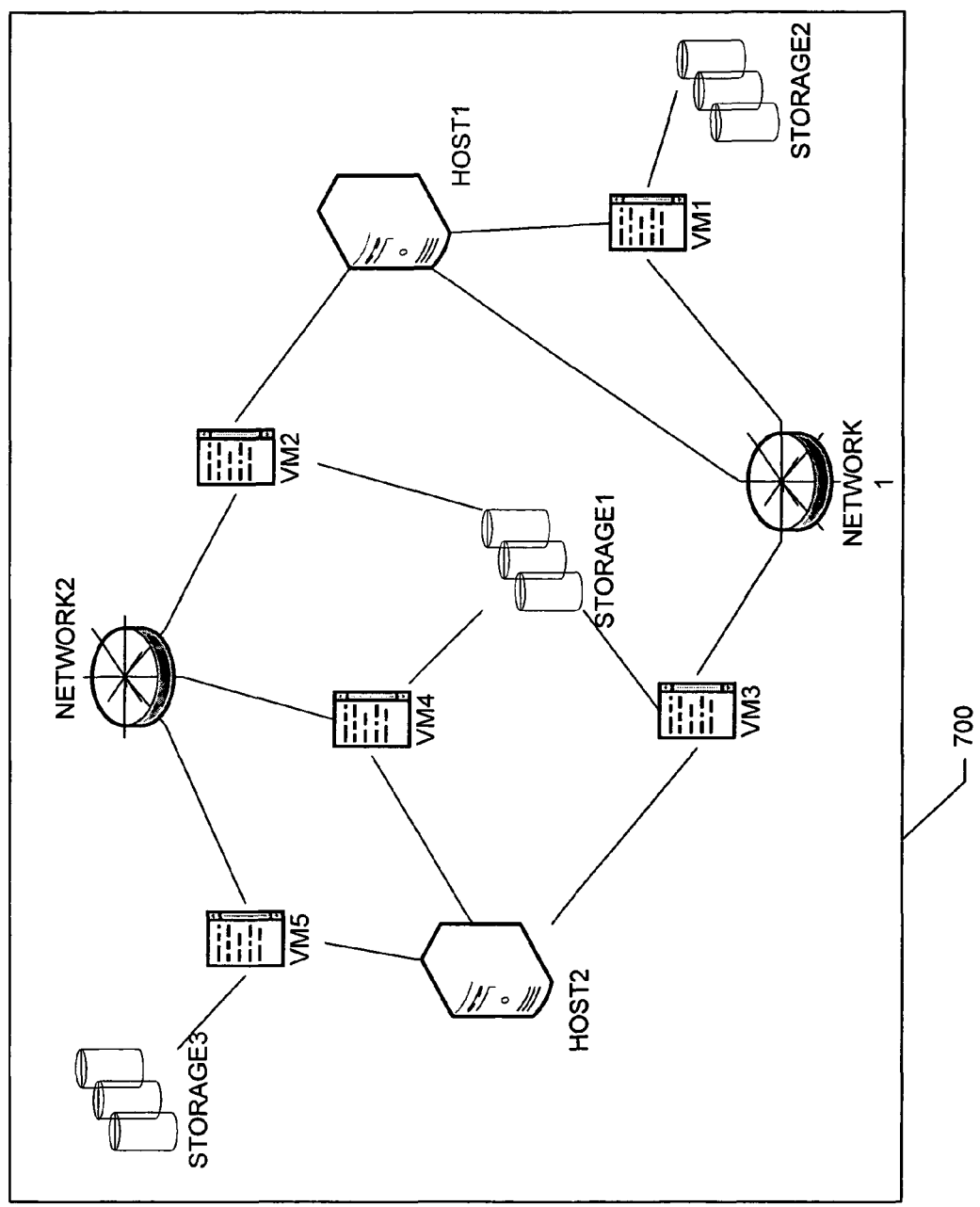
FIGS. 7A and 7B are topology diagrams corresponding to the relationships represented, respectively, in FIGS. 6A and 6B.

Further, the edge-reduced information, as represented in FIG. 6A, can then be submitted to a topology diagram rendering engine with a resultant display 700 as shown in FIG. 7A. The topology diagram 700 may be presented to a user to represent the particular network 500 of this example. It should be noted that the choice of icons to represent either a host, virtual machine, storage system or network, are design choices and not limited to the icons shown herein. One of ordinary skill in the art would understand that any one or more of the number of different icons of different shapes and cultural relevance that are commonly available may be used.

Returning to the edge-reduced conceptual diagram of FIG. 6A, in accordance with another embodiment of the present invention, the filtering function may be applied. As an example, and for discussion purposes only, a filtering rule may be applied to show only virtual machine nodes that are not solely on a shared storage system. Shared storage can be determined, for example, by an attribute of a storage system. Alternatively, the determination as to whether or not a storage system is shared can be derived from the topology itself because a storage system that is related to only one host is not shared. Determining which virtual machines that are not solely on shared storage may help a system administrator to identify potential vulnerabilities in the system.

Figure 6B:
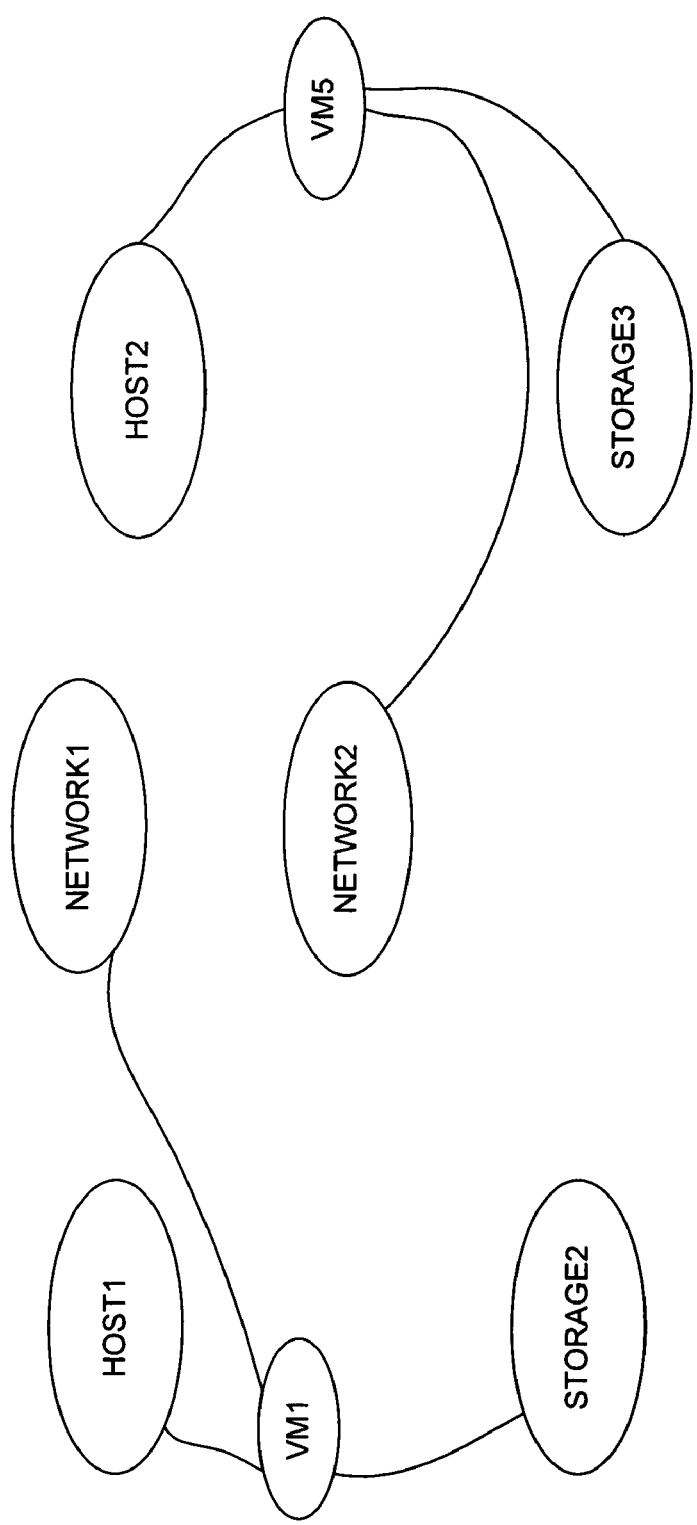
Figure 7B:
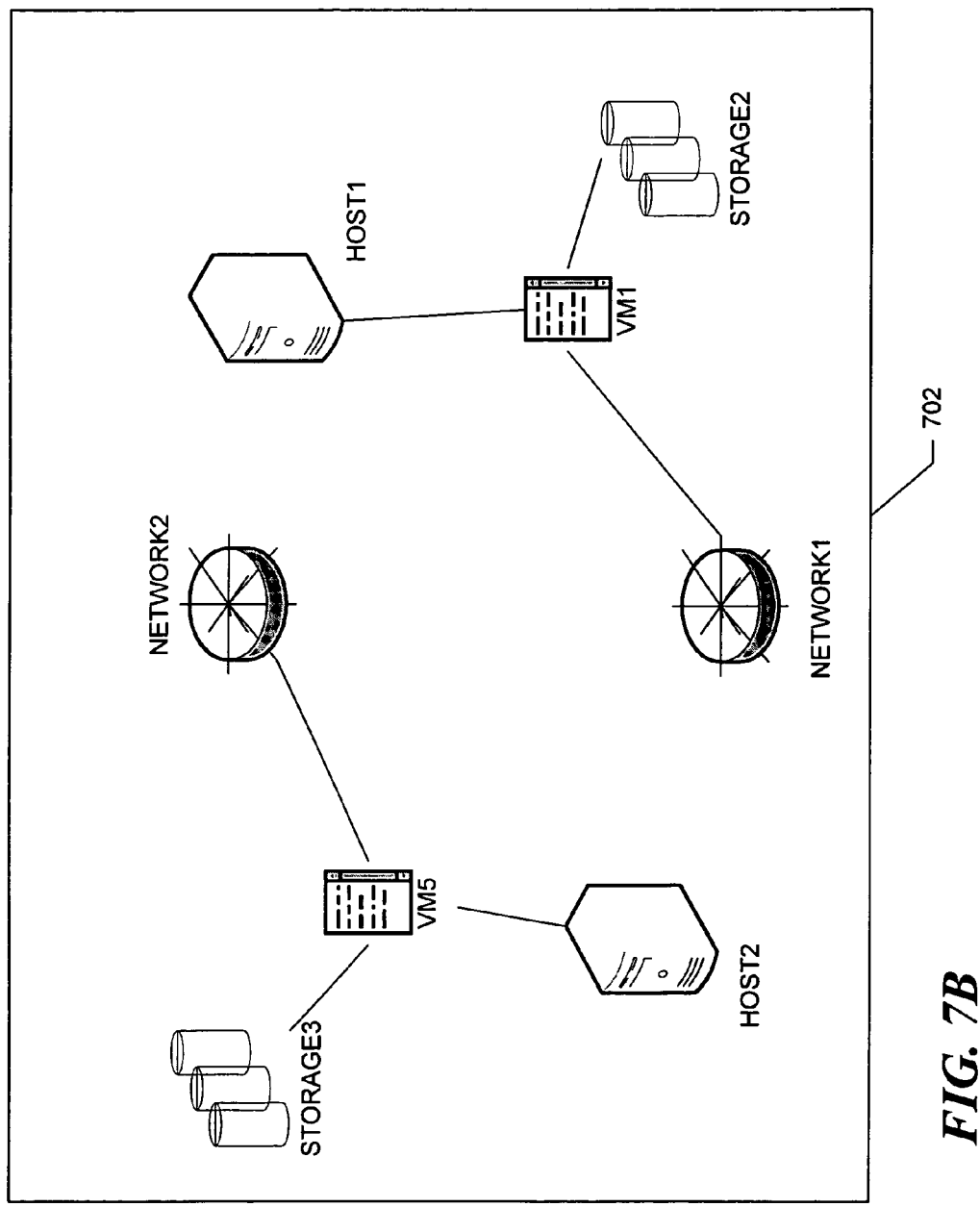

In the example network 500, STORAGE1 is shared storage because of its connections to HOST1 and HOST2. There are, in the example network 500, two virtual machines, VM1 and VM5, that are not solely on the shared storage STORAGE1. As can be seen, VM1 has another connection to STORAGE2 and VM5 has no connection at all to STORAGE1. The other virtual machines are filtered from the list and the remaining connections and nodes can be conceptually presented as shown in FIG. 6B. A subsequent topology diagram 702, as represented in FIG. 7B, would represent the "filtered" topology.

Advantageously, the present invention provides techniques for producing a readable diagram for a network that may comprise hundreds of elements. The techniques employed by the embodiments of the present invention reduce the number of line crossings and hide relationships that can be inferred from other relationships between elements.

Figure 9:
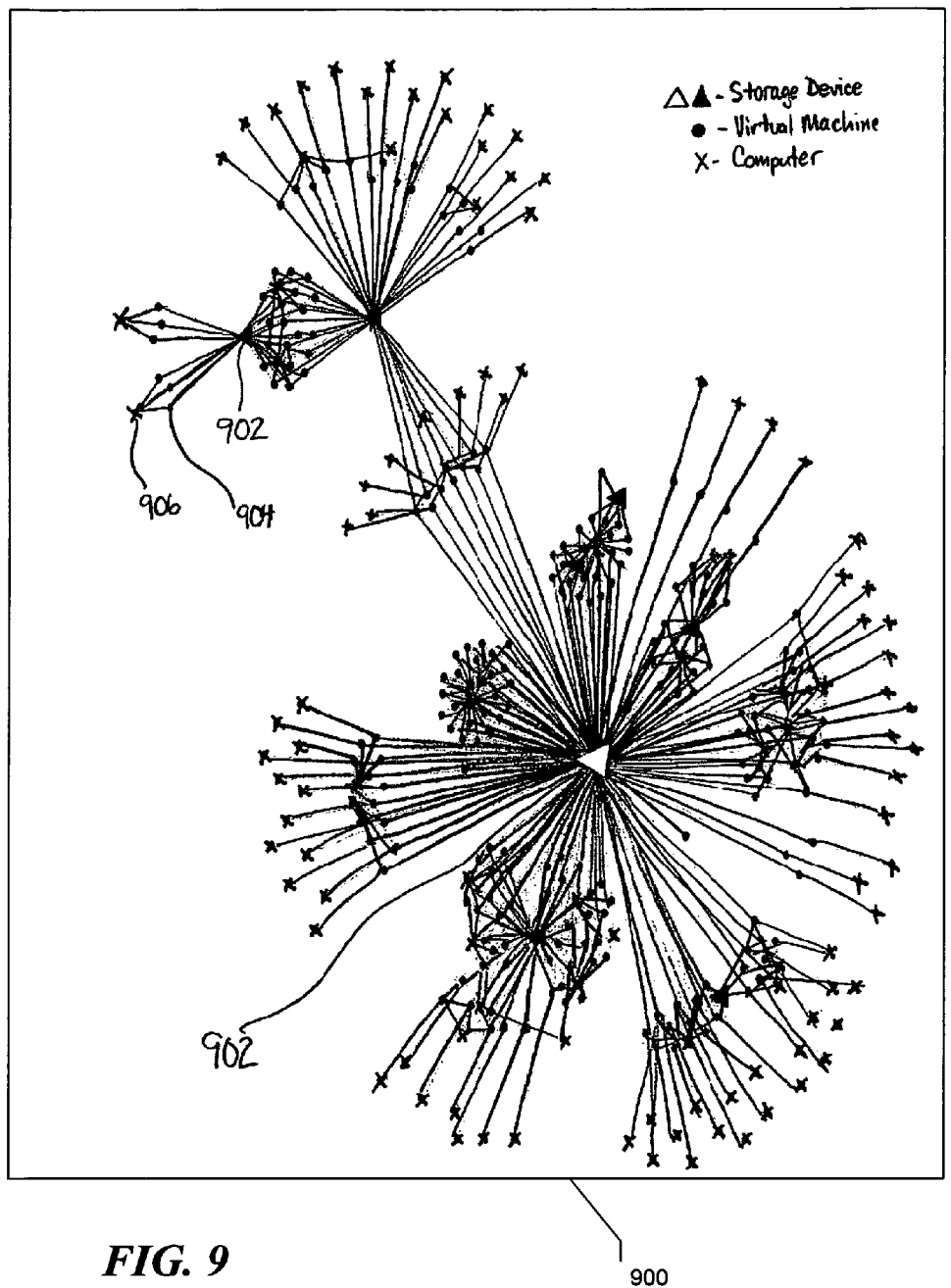
FIG. 9 is a topology diagram generated in accordance with one embodiment of the present invention.

The virtual machine network 500 is a very simplistic example provided for explanatory purposes. As above, a real-world virtual machine network could have hundreds, even thousands, of nodes. The representation of such a complex network is made more easily understandable by application of the present invention. Further, as the network becomes more complex, it is advantageous to have simpler icons to represent nodes. By applying the edge-reducing algorithm of the present invention to such a virtual machine network, a topology diagram 900, as shown in FIG. 9, may result. Using straightforward icons such as a triangle 902 to represent a storage device or system, a dot 904 to represent a virtual machine and an X 906 to represent a computer, one can quickly get a sense of the relationships between the elements in the network. As shown in FIG. 9, sets of elements have been displayed to form clusters around other elements with which there is some commonality. Those elements with many relationships are positioned nearer the center of the graph 900. Those elements of fewer relationships appear on an outer edge of the graph 900. Thus, the topology diagram 900, as a result of the application of the present invention, is able to show qualitative resource dependencies for a system with hundreds of elements sharing over one thousand relationships.

While the topology diagram 900 qualitatively presents information regarding the relationships between elements in the network, the specific identities of these nodes are not displayed in the topology diagram 900. In accordance with another embodiment of the present invention, informational icons are chosen to represent the nodes in a network.

Figure 10:
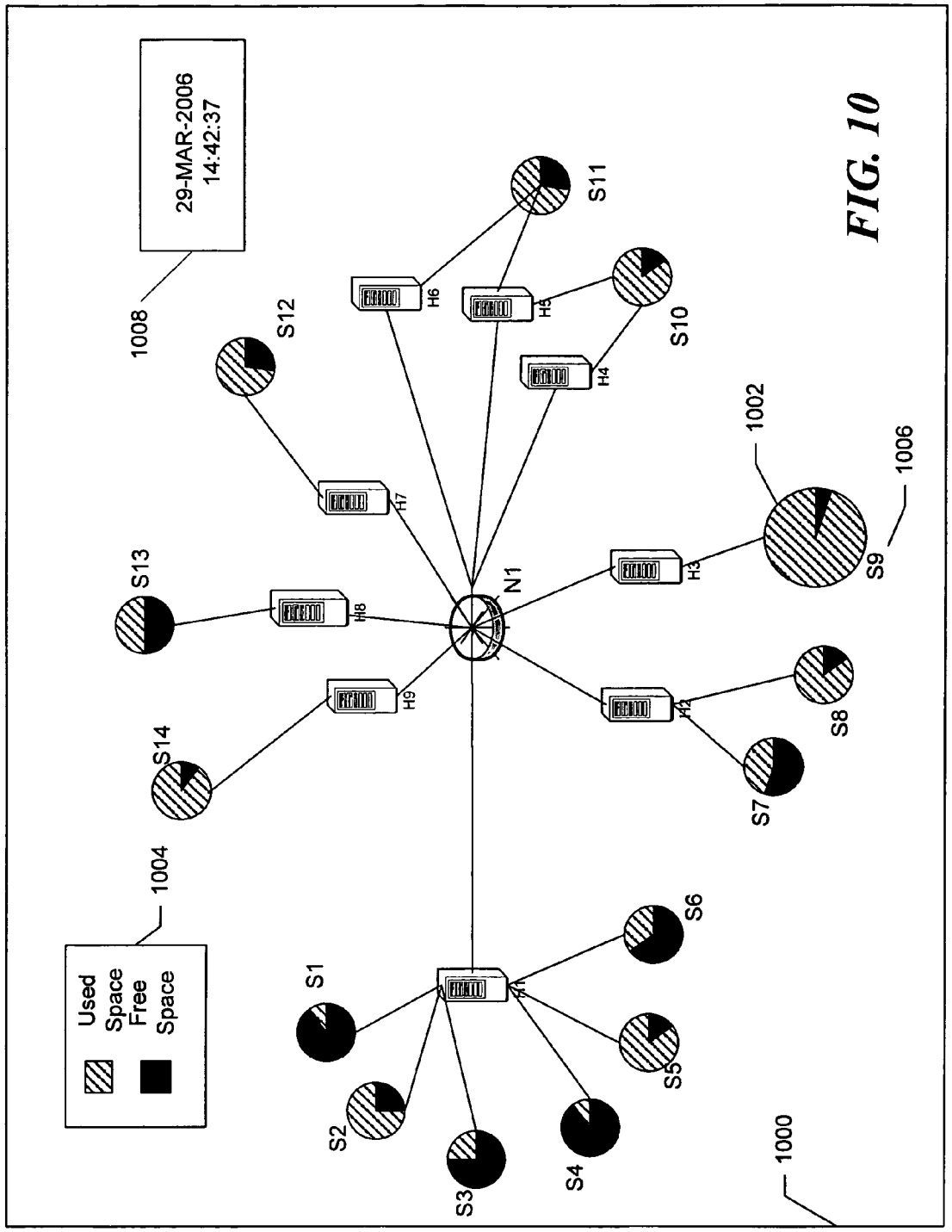
FIG. 10 is a topology diagram generated in accordance with another embodiment of the present invention.

Referring to FIG. 10, a topology diagram 1000 represents data storage devices using a pie chart icon 1002. The pie chart icon 1002 is used to represent an amount of used space and free space that is available for the corresponding device in the network. A legend block 1004 may be provided to indicate, for a specific storage node, the relative amounts of used space versus free space. Further, each storage device in the topology diagram 1000 is provided with a name identifier 1006 that corresponds to a particular actual device in the system. Once the edge-reduction algorithm is applied to the network data, and the resulting information is then displayed, a viewer of the topology diagram will be able to quickly discern the relationships between the nodes in addition to their respective identities. Further, as shown in the topology diagram 1000, a user can quickly ascertain which storage devices are not only related to a large number of other elements but also which are dangerously low on free space. A highly connected data storage device with a relatively low amount of free space may indicate a potential bottleneck or point of failure in the network. Of course, the earlier such a situation can be identified and remedied, the more efficient the network may operate.

In a refinement, in accordance with one embodiment of the present invention, a time stamp block 1008 may also be provided in the topology diagram 1000 to represent when the "snapshot" of the network was obtained. Trend analysis may be accomplished by viewing sequential snapshots of the network device statuses in order to obtain a sense of any trends that may be occurring in the network.

Further, and in accordance with another embodiment of the present invention, to account for the potential changes in relationships between nodes in a network, especially applicable in a network running multiple virtual machines on various computers and storage devices, a mechanism would be provided to "normalize" a display from one snapshot to another. This may involve some amount of animation such that there is consistency from one snapshot to a next as to the relative positioning of nodes. One of ordinary skill in the art would understand how such animation and consistency could be provided.

Still further, either of the topology diagrams 900 and 1000 may be implemented in a "real-time" environment. In such a real-time environment, information regarding the nodes in the network and their respective relationships, i.e., edges, is constantly being retrieved and displayed. Depending upon a refresh rate that is chosen for the display, and which may be a function of the complexity of the network, changes over time with respect to, for example, storage device capacity, as well as relationships, may be viewed. These snapshots could be stored and then replayed for review of system performance. These snapshots taken over time are analogous to animated weather radar displays as seen on the news or on any one of a number of weather-related websites. Thus, "storms" of activity that may be occurring, or may have occurred, in a network could be spotted and the network or system adapted accordingly.

The present invention provides a map or diagram of systems that could not be represented by any previously known mechanism for graphing a network. Once a network has more than a couple of hundred elements or nodes, fixed location algorithms, for example, symmetric layout algorithms, provide maps that are too large to be of any use. When reduced to fit on a single page of paper or in one screen on a display, individual detail disappears and, therefore, the information is lost. Even if a "zoom" capability is used on the too large map, while details may become available, the relationships between items becomes lost.

The present invention provides the relationship information between nodes, is easier to read, and is manageable for viewing on a single screen or sheet of paper.

Embodiments of the above-described invention may be implemented in either all software, all hardware, or a combination of hardware and software, including program code stored in a firmware format to support dedicated hardware.

Figure 8:
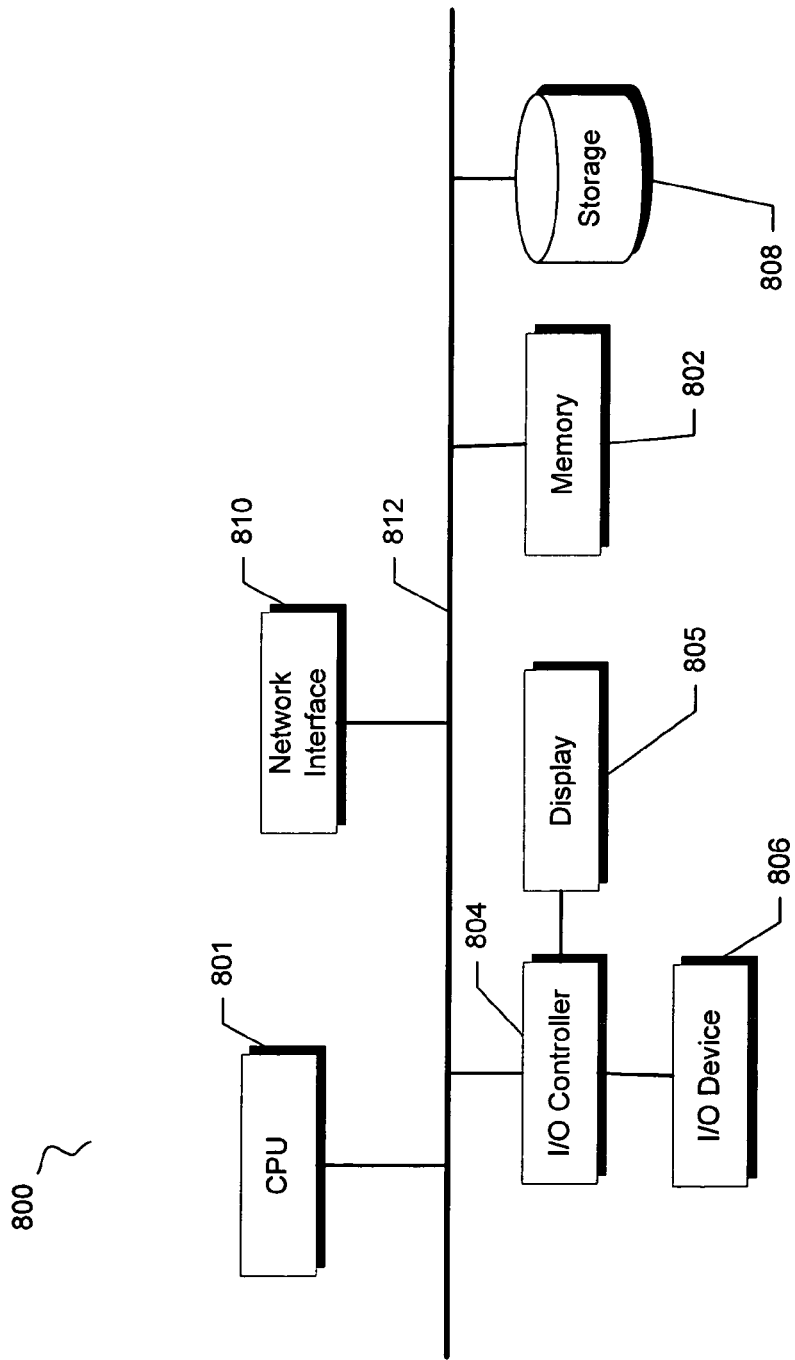
FIG. 8 is a block diagram illustration of a system for implementing one or more embodiments of the present invention.

With respect to a hardware embodiment, any one of a number of different devices may be used, as is understood by one of ordinary skill in the art. These devices, however, have some components and/or functionality in common irrespective of their relative technical complexities. As shown in FIG. 8, such a system 800 might include a central processing unit 801; a memory 802; an input/output device or controller 804 to couple to an IO device 806, e.g., a keyboard, keypad or touch screen; a mass storage device 808, e.g., a hard disk drive; and a network interface 810 for communicating to a network. A bus 812 couples these devices to one another to allow communication between them. The IO controller 804 may also be coupled to a display device 805.

A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

What is claimed is:

1. A method of representing connectivity within a network comprising:
   identifying nodes of the network;
   selectively reducing the number of connections to be represented among the nodes on a basis of lessening complexity of a graphical representation of the network, the selective reduction being such that information representing operations within the network is reduced without a reduction in such operations, the selective reduction including:
   (a) identifying a pair of the nodes of the network, wherein the pair of nodes includes a primary node and a secondary node, the primary node and the secondary node being related to each other;
   (b) identifying a third node that is connected both to the primary node and the secondary node;
   (c) selecting the connection between the secondary node and the third node as a connection to remain unrepresented within the graphical representation, so as to achieve the lessening of complexity in the graphical representation by removing representation of links between the secondary node and the third node; and
   depicting, by a microprocessor, the graphical representation of the network, including depicting the nodes of the network and depicting the reduced number of connections among the nodes.

2. The method of claim 1, wherein a host being depicted by the primary node and a virtual machine running on the host being depicted by the secondary node.

3. The method of claim 1, wherein the primary node, the secondary node and the third node is one of a host computer, a storage system, a network node and a virtual machine node.

4. The method of claim 1, wherein selectively reducing the number of connections to be represented includes executing (a), (b) and (c) for a plurality of pairs of connected nodes in the network, the number of connections to be represented being reduced without regard to representing operations within the network.

5. The method of claim 4, wherein the plurality of pairs of connected nodes comprises a subset of all pairs of connected nodes in the network.

6. The method of claim 5, further comprising:
   defining the subset of all pairs of connected nodes in the network such that each pair comprises at least one node having one or more predefined parameter values.

7. The method of claim 5, wherein:
   the subset of all pairs of connected nodes is determined as a function of a filtering process applied to the nodes and connections in the network.

8. A system for graphically representing a plurality of interconnected nodes in a network, the system comprising a memory containing a first program and a first processor operative to execute the first program, the first program comprising:
   program code for selectively reducing the number of connections to be represented among the interconnected nodes on a basis of lessening complexity of a graphical representation of the network, the selective reduction that is based on lessening complexity being such that information representing operations within the network is reduced without a reduction in such operations, the program code for selectively reducing the number of connections being executable for:
      (a) identifying a pair of the nodes in the graphical representation of interconnected nodes of the network, wherein the pair of nodes includes a primary node and a secondary node, the primary node and the secondary node being related to each other;
      (b) identifying a third node that is connected both to the primary node and the secondary node; and
      (c) selecting the connection between the secondary node and the third node as a connection to remain unrepresented within the graphical representation, so as to achieve the lessening of complexity in the graphical representation by removing representation of links between the secondary node and the third node; and
   program code for generating the graphical representation of the network, including depicting each of the nodes of the network and the reduced number of connections among the nodes, such that the graphical representation depicts connectivity among the primary node, the secondary node and the third node with reduced complexity.

9. The system of claim 8, wherein the first program further comprises:
   program code for applying a filtering process to reduce a number of pairs of connected nodes to be processed.

10. The system of claim 8, wherein each node is one of a host computer, a storage system, a network node and a virtual machine node.

11. The system of claim 8, wherein the program code for selectively reducing the number of connections executes (a), (b) and (c) for each of a plurality of pairs of connected nodes in the network and executes to reduce the number of connections to be represented without regard to representing operations within the network.

12. The system of claim 8, wherein the plurality of pairs of nodes comprise a subset of all pairs of connected nodes in the network.

13. The system of claim 12, wherein the first program further comprises:
   program code for defining the subset of all pairs of connected nodes in the network such that each pair of the subset comprises at least one node having one or more predefined parameter values.

14. The system of claim 12, wherein:
   the subset of all pairs of connected nodes is determined as a function of a filtering process applied to the interconnected nodes and connections in the network.

15. In a computer network comprising a plurality of interconnected nodes, each of the interconnected nodes having a node type, wherein each of the interconnected nodes is one of a host system, a virtual machine instance, a network node and a storage system, a method of representing the interconnected nodes and the interconnections therebetween, comprising:

determining a plurality of pairs of connected nodes in the plurality of interconnected nodes;
for each of the pairs of connected nodes in the plurality of interconnected nodes:
   if a first node is of a first type and a second node is of a second type, the first type being different from the second type, the first node and the second node being related to each other such that operability of the first node within the computer network depends on operability of the second node:
      identifying a common node of a third type, the third type being different from the first type and the second type, the common node being connected to the first node and the second node; and
      removing, from subsequent processing, all connections from the second node to the common node; and
processing and depicting, by a microprocessor, the remaining interconnected nodes and connections, wherein the depicting is performed after the removing.

16. The method of claim 15, wherein determining the plurality of pairs of connected nodes comprises:
   adding a pair of connected nodes to a determined plurality of connected nodes if at least one node of the pair meets a predetermined criteria, the predetermined criteria including at least one of a node type, a node class, and a node parameter.

17. The method of claim 15, wherein:
   the virtual machine instance is the first type of node.

18. The method of claim 15, wherein:
   the host system is the second type of node.

19. A system for graphically representing a network comprising a plurality of interconnected nodes, each of the interconnected nodes having a node type, each of the interconnected nodes is one of a host, a virtual machine instance, a network node and a storage node, the system comprising a memory containing a first program and a first processor operative to execute the first program, the first program comprising:
   program code for determining a plurality of pairs of connected nodes in the plurality of interconnected nodes;
   program code for executing: for each of the pairs of connected nodes in the plurality of interconnected nodes:
      if a first node is of a first type and a second node is of a second type, the first type being different from the second type, the first node and the second node being related to each other such that operability of the first node within the network depends upon operability of the second node:
         identifying a common node of a third type, the third type being different from the first type and the second type, the common node connected to the first node and the second node; and
         removing, from subsequent processing, all graphical representations of connections from the second node to the common node; and
   program code for processing and graphically representing the remaining interconnected nodes and connections, wherein the graphically representing is performed after the removing.

20. The system of claim 19, wherein the program code for determining the plurality of pairs of connected nodes comprises:
   program code for adding a pair of connected nodes to a determined plurality of connected nodes if at least one node of the pair meets a predetermined criteria, the predetermined criteria including at least one of a node type, a node class, and a node parameter.

21. The system of claim 19, wherein:
the virtual machine instance is the first type of node.

22. The system of claim 19, wherein:
the host is the second type of node.

* * * * *